US008630414B2

(12) United States Patent
Hsu

(10) Patent No.: US 8,630,414 B2
(45) Date of Patent: Jan. 14, 2014

(54) INTER-WORKING FUNCTION FOR A COMMUNICATION SYSTEM

(75) Inventor: Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1931 days.

(21) Appl. No.: 10/176,562

(22) Filed: Jun. 20, 2002

(65) Prior Publication Data

US 2003/0236982 A1 Dec. 25, 2003

(51) Int. Cl.
*H04K 1/00* (2006.01)
(52) U.S. Cl.
USPC ............................ 380/247; 709/225; 709/229
(58) Field of Classification Search
CPC ...................................................... H04K 1/00
USPC ............... 713/1; 709/225, 229; 705/225, 229; 706/225, 229; 380/247
See application file for complete search history.

(56) References Cited

U.S. PATENT DOCUMENTS

| 5,490,203 | A | * | 2/1996 | Jain et al. .................... 455/435.1 |
| 5,537,474 | A | | 7/1996 | Brown et al. |
| 5,796,727 | A | * | 8/1998 | Harrison et al. ............. 370/338 |
| 6,085,247 | A | | 7/2000 | Parsons, Jr. et al. |
| 6,105,133 | A | | 8/2000 | Fielder et al. |
| 6,128,389 | A | | 10/2000 | Chan et al. |
| 6,144,848 | A | | 11/2000 | Walsh et al. |
| 6,349,337 | B1 | | 2/2002 | Parsons et al. |
| 6,502,144 | B1 | | 12/2002 | Accarie |
| 6,769,000 | B1 | | 7/2004 | Akhtar et al. |
| 6,813,496 | B2 | | 11/2004 | Numminen et al. |
| 6,996,631 | B1 | | 2/2006 | Aiken, Jr. et al. |
| 7,023,868 | B2 | | 4/2006 | Rabenko et al. |
| 7,116,646 | B1 | | 10/2006 | Gustafson et al. |
| 7,171,460 | B2 | | 1/2007 | Kalavade et al. |
| 7,174,452 | B2 | | 2/2007 | Carr |
| 7,190,793 | B2 | | 3/2007 | Hsu |
| 7,197,763 | B2 | | 3/2007 | Hsu |
| 7,260,638 | B2 | | 8/2007 | Crosbie |
| 7,350,076 | B1 | | 3/2008 | Young et al. |
| 8,094,821 | B2 | | 1/2012 | Hsu |
| 2002/0006137 | A1 | | 1/2002 | Rabenko et al. |

(Continued)

FOREIGN PATENT DOCUMENTS

EP 0998094 5/2000
EP 1075123 A1 2/2001

(Continued)

OTHER PUBLICATIONS

"Specification for enhanced Security," IEEE Standard 802.11i, draft 2.0, Mar. 2002.

(Continued)

*Primary Examiner* — Jacob Lipman
(74) *Attorney, Agent, or Firm* — Charles E. Eggers

(57) ABSTRACT

Inter-Working Function (IWF) for interfacing between a Wireless Local Area Network (WLAN) and a communication system. The IWF may contain sufficient information to authenticate a user access to the WLAN, or the IWF may need to request authentication from the communication system. In one embodiment, the IWF sends an access challenge to the WLAN for a user. The IWF may then pass a response to the challenge on to the communication system for authentication. The IWF allows the WLAN to use the authentication capability of the communication system for local authentication.

6 Claims, 7 Drawing Sheets

(56) References Cited

U.S. PATENT DOCUMENTS

| | | |
|---|---|---|
| 2002/0012433 A1 | 1/2002 | Haverinen et al. |
| 2002/0184527 A1 | 12/2002 | Chun et al. |
| 2003/0051140 A1 | 3/2003 | Buddhikot et al. |
| 2003/0095663 A1 | 5/2003 | Nelson et al. |
| 2003/0235305 A1 | 12/2003 | Hsu |
| 2003/0236980 A1 | 12/2003 | Hsu |
| 2005/0138355 A1 | 6/2005 | Chen et al. |
| 2005/0220086 A1 | 10/2005 | Dowling |
| 2009/0193253 A1 | 7/2009 | Falk et al. |

FOREIGN PATENT DOCUMENTS

| | | |
|---|---|---|
| GB | 2342817 A | 4/2000 |
| GB | 2355885 A | 5/2001 |
| JP | 09265456 | 10/1997 |
| JP | 10149237 | 6/1998 |
| JP | 10285630 | 10/1998 |
| JP | 10303930 A | 11/1998 |
| JP | 11215116 | 8/1999 |
| JP | 2000124893 A | 4/2000 |
| JP | 2001103574 | 4/2001 |
| JP | 2001111544 | 4/2001 |
| JP | 2001177513 A | 6/2001 |
| JP | 01357017 | 12/2001 |
| JP | 2002009762 | 1/2002 |
| JP | 2002077441 | 3/2002 |
| JP | 2002124952 | 4/2002 |
| JP | 2002516521 | 6/2002 |
| JP | 2003530012 A | 10/2003 |
| JP | 2005094758 A | 4/2005 |
| KR | 1020000071288 | 11/2000 |
| KR | 010090038 | 10/2001 |
| KR | 1020020004666 | 1/2002 |
| KR | 020044344 | 6/2002 |
| RU | 2132597 | 6/1999 |
| TW | 372384 | 10/1999 |
| TW | 389016 B | 5/2000 |
| TW | 453089 B | 9/2001 |
| TW | 461203 | 10/2001 |
| WO | WO9533348 A1 | 12/1995 |
| WO | 0014990 A1 | 3/2000 |
| WO | WO0025475 A1 | 5/2000 |
| WO | 0048357 A1 | 8/2000 |
| WO | 0137497 | 5/2001 |
| WO | WO0159190 A1 | 8/2001 |
| WO | WO0176134 A1 | 10/2001 |
| WO | WO0219617 | 3/2002 |
| WO | WO0219817 | 3/2002 |
| WO | 03105380 | 12/2003 |
| WO | 2005032013 A1 | 4/2005 |

OTHER PUBLICATIONS

J. Arkko et al. "EAP AKA Authentication," Nokia, Internet draft, Feb. 2002, pp. 1-27.

L. Blunk et al. "PPP Extensible Authentication Protocol," Merit Network, Inc., Standard Track, Mar. 1998, pp. 1-13.

John Vollbrecht et al. "Wireless LAN Access Control and Authentication," 8021 1 b Wireless Networking and Why it Needs Authentication; Interlink Networks, 2002, pp. 1-26.

C. Rigney et al. "Remote Authentication Dial in User Service (RADIUS)" Network Working Group, Standard Tracks, Apr. 1997, pp. 1-65.

TR45.AHAG Common Cryptographic Algorithms, Revision D.1, Publication Version, Telecommunications Industry Association, Sep. 2000.

G. Zorn "Microsoft Vendor-specific RADIUS Attributes" Informational, Microsoft Corporation; Network Working Group, Mar. 1999, pp. 1-37.

R. Rivest "The MD5 Message-Digest Algorithm" MIT Laboratory for computer Science and RSA Data Security, Inc.; Network Working Group, Apr. 1992, pp. 1-19.

H. Krawczyk et al. "HMAC: Keyed-Hashing for Message Authentication" Informational, Network Working Group, Feb. 1997, pp. 1-10.

C. Rigney et al. "Remote Authentication dial in User Service (RADIUS)," Standard Tracks, Network Working Group, Jun. 2000, pp. 1-68.

Ala-Laurila et al., "Wireless LAN Access Network Architecture for Mobile Operators," *IEEE Communications Magazine*, XP-001107810, Nov. 2001, pp. 82-89.

Rigney, et al., "Remote Authentication Dial in User Service (RADIUS)", Network Working Group, Apr. 1997.

Stargel, "Wireless LANs and 802.1x", Wireless LAN Security, Online!, Dec. 12, 2001. pp. 1-7.

International Search Report, PCT/US03/019460, International Search Authority, European Patent Office, Apr. 21, 2004.

ETSI TS 100 929 V7.2.0, "Digital Cellular Telecommunications system (Phase 2+); Security related netowrk functions (GSM 03.20 version 7.2.0 Release 1998)," European Telecommunications Standards Institute, Nov. 1999, p. 22.

European Search Report—EP09013590—Search Authority—Munich—Dec. 1, 2009.

Aboba D; Simon B: "PPP EAP TLS Authentication Protocol; rfc2716.txt" IETF Standard, Internet Engineering Task Force, IETF, CH, Oct. 1, 1999 XP015008499 ISSN: 0000-0003.

Blumenthal U et al: "A Scheme for Authentication and Dynamic Key Exchange in Wireless Networks" Bell Labs Technical Journal, Wiley, CA, US, vol. 2, No. 7, Aug. 2002, pp. 37-48, XP001141703 ISSN: 1089-7089.

European Search Report—EP10009983, Search Authority—Munich Patent Office, Oct. 19, 2010.

Haverinen H et al: "Authentication and key generation for mobile IP using GSM authentication and roaming" ICC 2001. 2001 IEEE International Conference on Communications. Conference Record. Helsinky, Finland, Jun. 11-14, 2001; [IEEE International Conference on Communications], New York, NY : IEEE, US, vol. 8, Jun. 11, 2001, pp. 2453-2457, XP010553567 ISBN: 978-0-7803-7097-5 p. 2454-p. 2456.

Ken Ojiri., A Service Controlling Method with Network Security in Advanced Intelligent Network, May 29, 1998.

ROC Taiwanese Search report—095131149—TIPO—Jun. 21, 2009.

Shigefusa Suzuki, Authentication Protocol Proposal for Roaming Service in Personal Communication System, Jun. 17, 1996.

Dabbous, N., et al., "EAP CAVE Authentication", Internet Draft, draft-lizhiming-pppext-eap-cave-00.txt, Apr. 15, 2004, p. 1-65.

Mizogui, A., et al., "A Development of Proxy Server for Encryption and Authentication, and its Experiment of UDP Packets Distribution", A Research Report of the Institute of Electronics, Information and Communication Engineers (IEICE), Japan, General Incorporated Association of the Institute of Electronics, Information and Communication Engineers, May 23, 1997, vol. 97, No. 66, pp. 7-12 (Japan domestic academic research paper 1997-00129-002).

* cited by examiner

US 8,630,414 B2

INTER-WORKING FUNCTION FOR A COMMUNICATION SYSTEM

REFERENCE TO CO-PENDING APPLICATIONS FOR PATENT

The present Application for Patent is related to the following co-pending Applications for Patent:
"Authentication in a Communication System," by Raymond Hsu, filed concurrently herewith, having Ser. No. 10/177,088, assigned to the assignee hereof and hereby expressly incorporated by reference; and
"Key Generation in a Communication System," by Raymond Hsu, filed concurrently herewith, having Ser. No. 10/177,017, assigned to the assignee hereof and hereby expressly incorporated by reference.

BACKGROUND

1. Field

Embodiments of the present invention relate to an inter-working function for a communication system and more specifically to mechanisms for common authentication and key exchange through an inter-working function for use in a Wireless Local Area Network (WLAN).

2. Background

A Wireless Local Area Network (WLAN) allows users virtually unrestricted access to Internet Protocol (IP) services and data networks. The use of a WLAN is not limited to laptop computers and other computing devices, but is rapidly expanding to include cellular telephones, Personal Digital Assistants (PDA)s, and other small wireless devices supported by an external network or carrier. For example, a wireless device communicating via a cellular carrier may roam into a WLAN in a cyber-cafe or work space. In this situation, the wireless device has access to the cellular system, but desires access to the WLAN. The WLAN access requires authentication. As the wireless device has already gained access to the cellular system, the need for further authentication is redundant. There is a need therefore, for an inter-working function that allows a common authentication for access to a cellular system and to a WLAN.

DETAILED DESCRIPTION

The word "exemplary" is used herein to mean "serving as an example, instance, or illustration." Any embodiment described herein as "exemplary" is not necessarily to be construed as preferred or advantageous over other embodiments An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
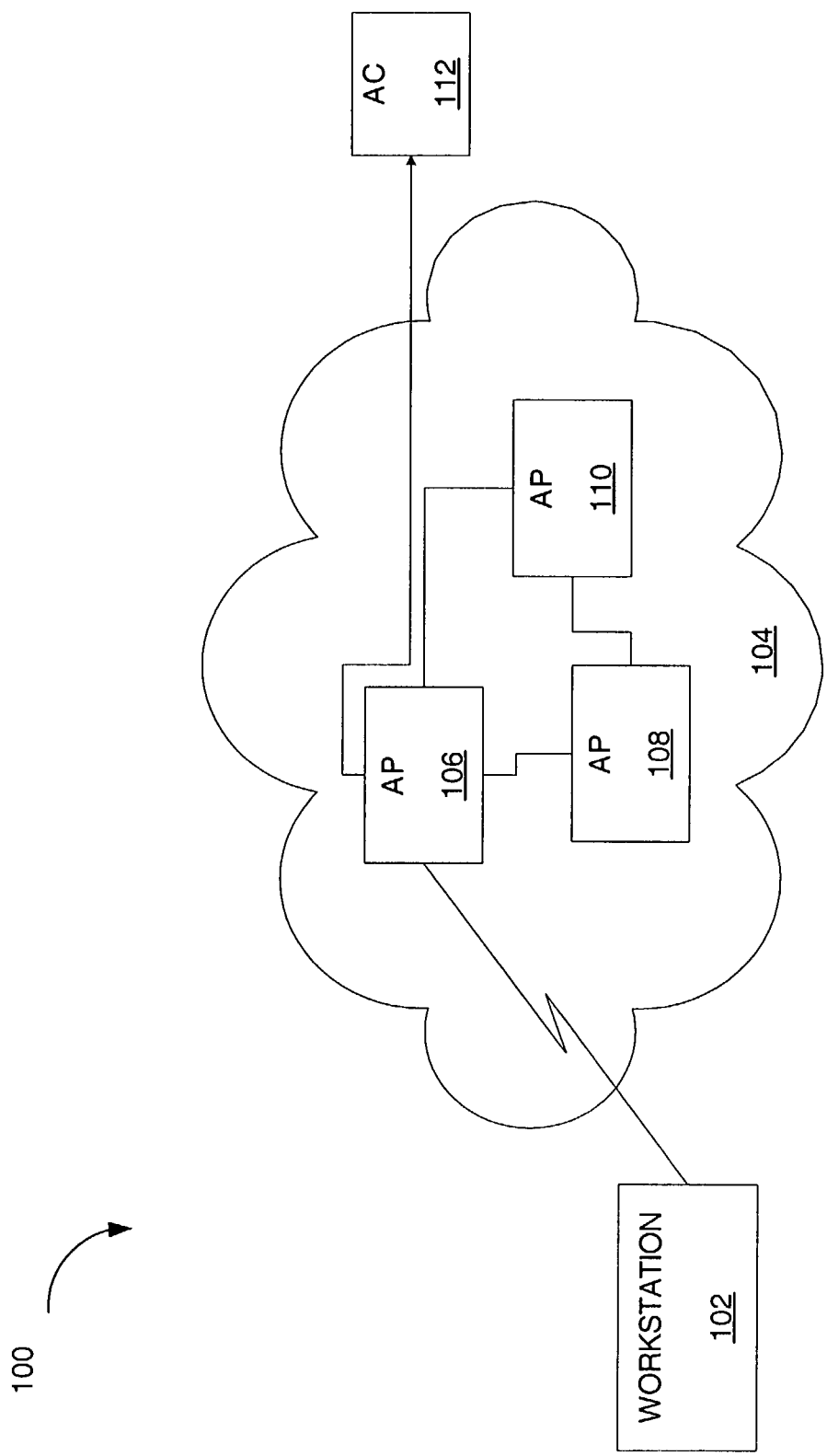
FIG. 1 is communication system including a Wireless Local Area Network (WLAN).

A Wireless Local Area Network (WLAN) 100 is illustrated in FIG. 1 having multiple Access Points (APs) 106, 108, 110. An AP is a hub or bridge that provides a star topology control of the wireless side of the WLAN 100, as well as access to the wired network.

Each AP 106, 108, 110, as well as others not shown, supports a connection to a data service, such as the Internet. A workstation 102, such as a laptop computer, or other digital computing device, communicates with an AP via the air interface, thus the term Wireless LAN. The AP then communicates with an Authentication Server (AS) or Authentication Center (AC) 112. The AC 112 is a component for performing authentication services for devices requesting admittance to a network. Implementations include Remote Authentication Dial-In User Service (RADIUS), which is an Internet user authentication described in RFC 2138, "Remote Authentication Dial In User Service (RADIUS)" by C. Rigney et at, published April 1997, and other Authentication, Authorization and Accounting (AAA) servers.

Wireless networking is emerging as a significant aspect of internetworking. It presents a set of unique issues based on the fact that the only boundary of a wireless network is the radio signal strength. There is no wiring to define membership in a network. There is no physical method to restrict a system within radio range to be a member of a wireless network. Wireless networking, more than any other networking technology, needs an authentication and access control mechanism. Various groups are currently working on developing a standard authentication mechanism. Currently the accepted standard is the IEEE 802.11.

The nature of an RF based network leaves it open to packet interception by any radio within range of a transmitter. Interception can occur far outside the users 'working' range by using hi-gain antennas. With readily available tools, the eavesdropper is not limited to just collecting packets for later analysis, but can actually see interactive sessions like web pages viewed by a valid wireless user. An eavesdropper can also catch weak authentication exchanges, like some website logins. The eavesdropper could later duplicate the logon and gain access.

Once an attacker has gained the knowledge of how a WLAN controls admittance, he may be able to either gain admittance to the network on his own, or steal a valid user's access. Stealing a user's access is simple if the attacker can mimic the valid user's MAC address and use its assigned IP address. The attacker waits until the valid system stops using the network and then takes over its position in the network. This would allow an attacker direct access to all devices within a network, or to use the network to gain access to the wider Internet, all the while appearing to be a valid user of the attacked network. Therefore, authentication and encryption become key concerns in implementation of a WLAN.

Authentication is the process of proving the identity of an individual or application in a communication. Such identification allows the service provider to verify the entity as a valid user and also to verify the user for the specific services requested. Authentication and authorization actually have very specific meanings, though the two names are often used interchangeably, and in practice are often not clearly distinguished.

Authentication is the process where a user establishes a right to an identity—in essence, the right to use a name. There are a large number of techniques that may be used to authenticate a user—passwords, biometric techniques, smart cards, certificates.

A name or identity has attributes associated with it. Attributes may be bound closely to a name (for example, in a certificate payload) or they may be stored in a directory or other database under a key corresponding to the name. Attributes may change over time.

Authorization is the process of determining whether an identity (plus a set of attributes associated with that identity) is permitted to perform some action, such as accessing a resource. Note that permission to perform an action does not guarantee that the action can be performed. Note that authentication and authorization decisions can be made at different points, by different entities.

In a cellular network, the authentication feature is a network capability that allows cellular networks to validate the identity of wireless device, thereby reducing unauthorized use of cellular networks. The process is transparent to subscribers. Customers are not required to do anything to authenticate the identity of their phones when they make a call.

Authentication typically involves a cryptographic scheme, wherein the service provider and the user have some shared information and some private information. The shared information is typically referred to as a "shared secret."

The A-Key

The authentication key (A-key) is a secret value that is unique to each individual cellular phone. It is registered with the cellular service provider and stored in the phone and Authentication Center (AC). The A-key is programmed into the phone by the manufacturer. It can also be entered manually by the user, from the wireless device menu, or by a special terminal at the point of sale.

The wireless device and the AC must have the same A-key to produce the same calculations. The primary function of the A-key is to be used as a parameter to calculate the shared secret data (SSD).

The Shared Secret Data (SSD)

The SSD is used as an input for authentication calculations in the wireless device and the AC, and is stored in both places. Unlike the A-key, the SSD may be modified over the network. The AC and the wireless device share three elements that go into the calculation of the SSD: 1) the Electronic Serial Number (ESN); 2) the Authentication Key (A-Key); and 3) a RANDom number for Shared Secret Data calculation (RANDSSD).

The ESN and RANDSSD are transmitted over the network and over the air interface. The SSD is updated when a device makes its first system access, and periodically thereafter. When the SSD is calculated, the result is two separate values, SSD-A and SSD-B. SSD-A is used for authentication. SSD-B is used for encryption and voice privacy.

Depending on the capabilities of the serving system, SSD may be shared or not shared between the AC and serving Mobile Switching Center (MSC). If secret data is shared, it means the AC will send it to the serving MSC and the serving MSC must be capable of executing CAVE. If it is not shared, the AC will keep the data and perform authentication.

The type of sharing affects how an authentication challenge is conducted. An authentication challenge is a message sent to challenge the identify of the wireless device. Basically, the authentication challenge sends some information, typically random number data, for the user to process. The user then processes the information and sends a response. The response is analyzed for verification of the user. With shared secret data, a challenge is handled at the serving MSC. With non-shared secret data, a challenge is handled by the AC. By sharing secret data, the system may minimize the amount of traffic sent and allow challenges to happen more quickly at the serving switch.

Authentication Procedures

In a given system, a Home Location Register (HLR) controls the authentication process by acting as intermediary between the MSC and AC. The serving MSC is set up to support authentication with the mobile's HLR and vice versa.

The device initiates the process by notifying the serving MSC if it is capable of authentication, by setting an authorization field in the overhead message train. In response, the serving MSC starts the registration/authentication process with an Authentication Request.

By sending the Authentication Request, the serving MSC tells the HLR/AC whether it is capable of doing CAVE calculations. The AC controls which of the serving MSC's as well as device capabilities will be used out of those available. When the serving MSC does not have CAVE capability, the SSD cannot be shared between the AC and MSC and therefore all authentication processes are performed in the AC.

The purpose of the Authentication Request (AUTHREQ) is to authenticate the phone and request SSD. The AUTHREQ contains two parameters for authentication, the AUTHR and RAND parameters. When the AC gets the AUTHREQ, it uses the RAND and the last known SSD to calculate AUTHR. If it matches the AUTHR sent in the AUTHREQ then authentication is successful. The return result to the AUTHREQ will contain the SSD if it can be shared.

The Challenge

The Authentication process consists of a challenge and response dialog. If SSD is shared, the dialog runs between the MSC and the device. If SSD is not shared, the dialog runs between the HLR/AC and the device. Depending on the switch type, the MSC may be capable of either a Unique Challenge, a Global Challenge, or both. Some MSCs are currently not capable of global challenge. The Unique Challenge is a challenge that occurs during call attempts only, because it uses the voice channel. Unique challenge presents an authentication to a single device during call origination and call delivery. The Global Challenge is a challenge that occurs during registration, call origination, and call delivery. The Global challenge presents an authentication challenge to all MSs that are using a particular radio control channel. It is called global challenge because it is broadcast on the radio control channel, and the challenge is used by all phones accessing that control channel.

During a challenge, the device responds to a random number provided by the MSC or AC. The device uses the random number and shared secret data stored in the device to calculate a response to the MSC. The MSC also uses the random number and shared secret data to calculate what the response from the device should be. These calculations are done through the CAVE algorithm. If the responses are not the same, service is denied. The challenge process does not increase the amount of time it takes to connect the call. In fact, the call may proceed in some cases, only to be torn down when authentication fails.

Wireless Local Area Networks (WLANs) have gained tremendous popularity as a means of providing users with untethered access to IP data networks. Third-generation (3G) wireless networks are also designed to offer high-speed data access; although the data rates they support are typically lower than those of WLANs, 3G networks offer data coverage over a much wider area. Though they might be viewed as competitors, WLAN and 3G networks may be complementary: WLANs offer high-capacity "hot-spot" coverage in public areas such as airport lounges and hotel lobbies, while 3G networks can provide users with nearly ubiquitous data service while on the move. Therefore, the same carrier may provide both 3G and WLAN access services under a single user subscription. This means that the MS uses the same authentication method and secret to both types of access authentication.

In 3G access authentication, the Authentication Center (AC) authenticates the MS. The AC and the MS have a shared secret. On the network side, the shared secret is securely stored in the AC and is not distributed to any other network entities. On the MS side, the shared secret is securely stored in the secured memory and is not distributed outside of it. The AC and MS use either the Cellular Authentication Voice Encryption (CAVE) or Authentication Key Agreement (AKA) as the authentication algorithm. The authentication parameters are delivered between the MS and AC via 3G over-the-air signaling messages and network signaling messages (e.g., IS-41).

In WLAN access authentication, it is desirable that the MS is authenticated by the same AC using the same shared secret and authentication algorithm (AKA or CAVE). However, different mechanisms are used to deliver the authentication parameters in WLAN. Specifically, the authentication parameters are delivered via the Extensible Authentication Protocol (EAP) and an AAA protocol (RADIUS or Diameter). The challenge is to interwork the delivery mechanisms between 3G and WLAN so that the authentication parameters can be delivered between the MS and AC for WLAN access authentication.

As stated hereinabove, the CAVE algorithm is commonly used for cellular communications and therefore, is well used and distributed. Alternate algorithms for authentication are also used. Specifically in data communications a variety of algorithms exist of varying complexity and application. To coordinate these mechanisms, the Extensible Authentication Protocol (EAP) has been developed as a general protocol framework that supports multiple authentication and key distribution mechanisms. The EAP is described in "PPP Extensible Authentication Protocol (EAP)" by L. Blunk et al., RFC 2284, published March 1998.

One such mechanism supported by the EAP as defined in "EAP AKA Authentication" by J. Arkko et al., published as an Internet Draft in February 2002, is the AKA algorithm. There is a need therefore to extend EAP to include the cellular algorithm CAVE. This is desirable to provide back compatibility for new systems and networks.

EAP

The Extensible Authentication Protocol (EAP) is a general protocol for authentication which supports multiple authentication mechanisms. EAP does not select a specific authentication mechanism during link set up and control, but rather postpones this until the authentication procedure begins. This allows the authenticator to request more information before determining the specific authentication mechanism. The authenticator is defined as the end of the link requiring the authentication. The authenticator specifies the authentication protocol to be used in the during link establishment.

Inter-Working Function (IWF)

Figure 2:
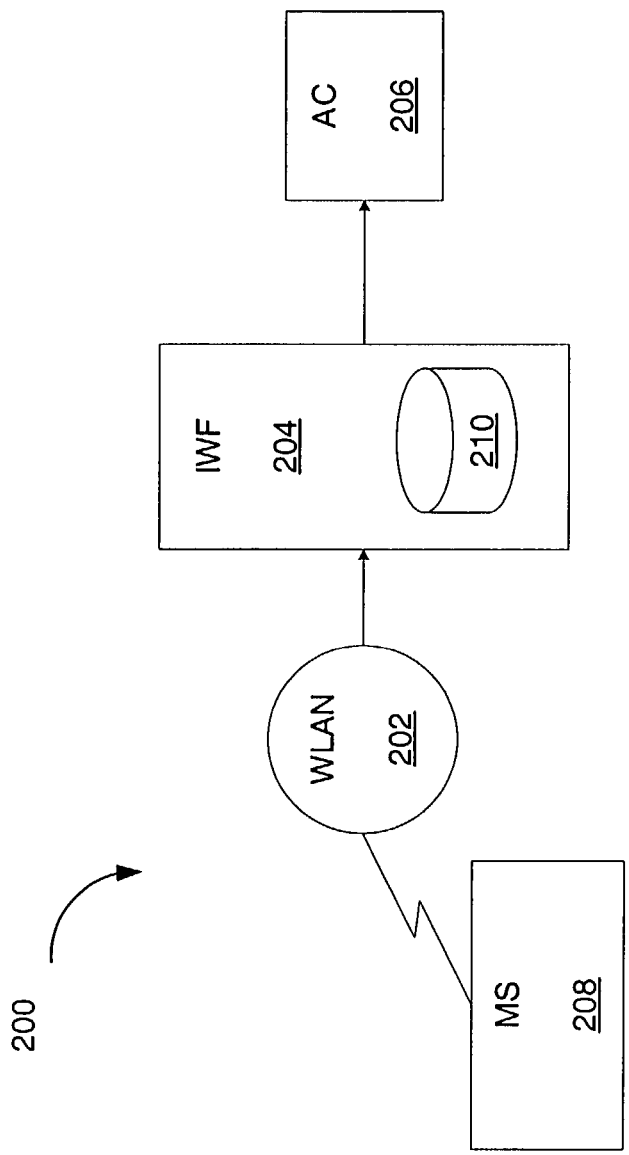
FIG. 2 is a communication system having an Inter-working Function (IWF) unit.

According to one embodiment, a new network entity is implemented and referred to as the Inter-Working Function (IWF) or more specifically, the AAA/IS-41 InterWorking Function (IWF). The IWF interworks the delivery mechanisms of authentication parameters (e.g., CAVE, AKA) between wireless networks, such as 3G, and WLAN networks. An IWF 204 is illustrated in FIG. 2 as part of a communication system 200. The system 200 includes a WLAN 202, an IWF 204 and an AC 206. As illustrated, a workstation 208 is currently within the communication range of the WLAN 202. The IWF 204 provides an interface between AC 206 and WLAN 202, allowing the use of a common authentication to allow MS 208 to gain access to the network. Note that the MS 208 may be a wireless workstation, a remote user, or other wireless device that is capable of communicating via a network other than the WLAN 202, which in this case is the network of which AC 206 is a part.

The IWF 204 is a one-way interworking function, i.e., the authentication request is originated from the WLAN 202. Note that in the current embodiment and illustration, AAA is the delivery mechanism for transporting authentication parameters between WLAN 202 and IWF 204. Further, IS-41 is the delivery mechanism for transporting authentication parameters between IWF 204 and AC 206. Specific to this example, RADIUS will be used as the AAA protocol.

Figure 3:
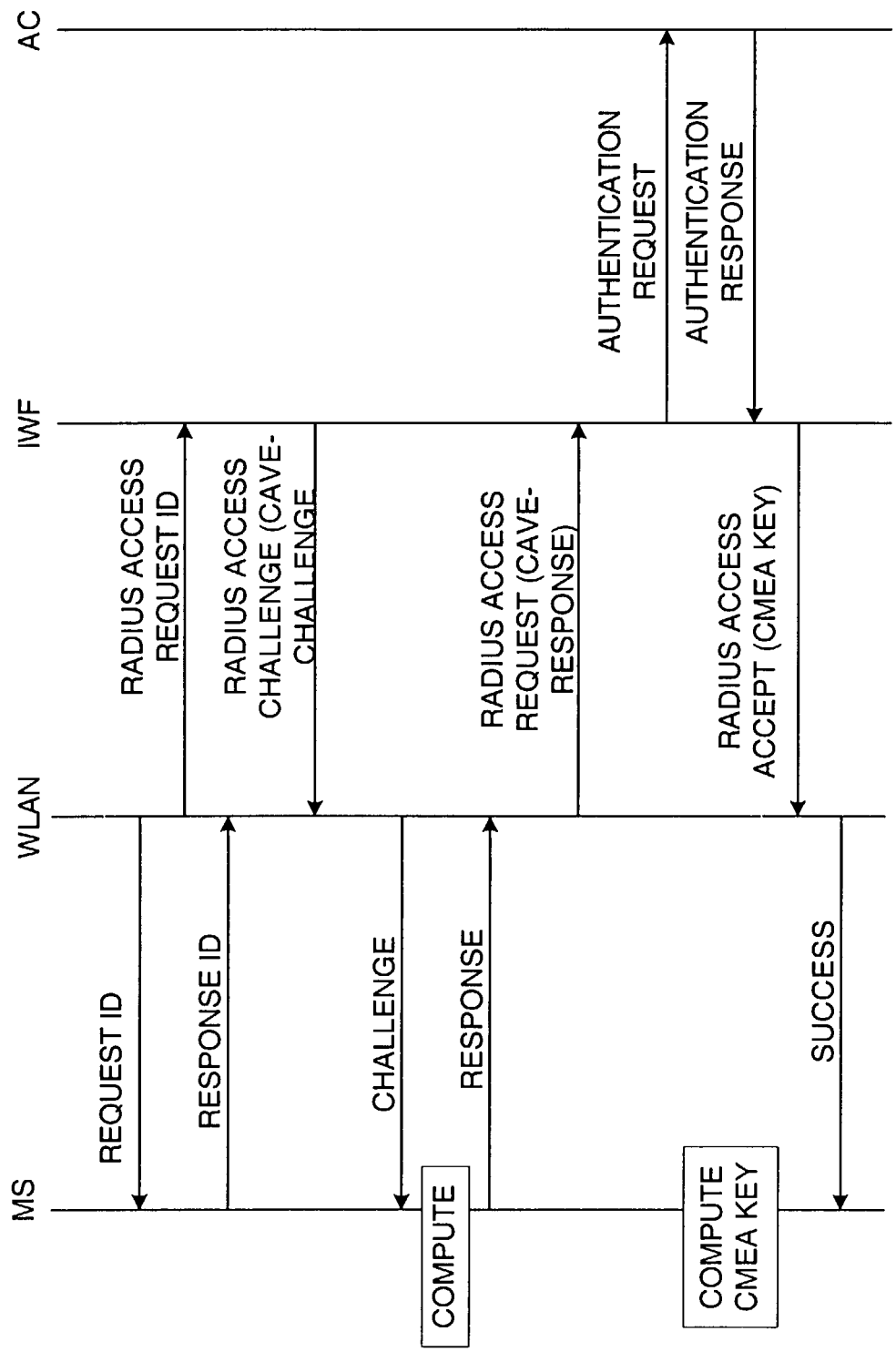
FIG. 3 is a timing diagram of an authentication process in a communication system

Authentication processing is illustrated in FIG. 3. Initially, the IWF 204 receives a RADIUS Access-Request message that contains the identity of the MS 208 (or wireless workstation) that wants to perform the authentication for access to the WLAN 202. The IWF 204 is configured with a database 210 storing the authentication capability associated with the MS 208, as well as other MS 208 currently registered via the AC 206. The database 210 is indexed by each MS 208 identity. Thus, the IWF 204 may determine the MS 208 authentication capability (e.g., AKA and/or CAVE).

If the MS 208 only supports CAVE, the IWF 204 performs the following procedure consistent with FIG. 3. The IWF sends a RADIUS Access-Challenge message that contains an EAP Request message containing a CAVE Challenge. As discussed hereinabove, the challenge contains a random number to be used by the MS 208 for computing an authentication response. The IWF 204 receives the RADIUS Access-Request message containing the EAP Response message (containing the CAVE Challenge Response). The CAVE response contains the MS 208 authentication response, i.e., the result of computations using the random number, and other parameters specific to the MS 208.

If the IWF 204 is not capable of verifying the EAP Response message, or specifically is not capable of verifying the CAVE response to the CAVE challenge, the IWF 204 sends an AUTHREQ message, which is an IS-41 message, to the AC 206. In this case, the IWF 204 does not have the information necessary to confirm the challenge response. The AUTHREQ message contains the IMSI assigned to the MS 208, the random number (i.e., the challenge), and the authentication response produced by the MS 208. The AC 206, which has knowledge of the shared secret specific to the MS 208, then verifies the MS 208 challenge response. The AC 206 returns the AUTHREQ message, which is an IS-41 message, to the IWF. The AUTHREQ message contains the authentication outcome. If successful, the AUTHREQ message also contains a key called the Cellular Message Encryption Algorithm (CMEA) key, which is used for protecting the MS 208 traffic in the WLAN 202. If the IWF 204 is unable to receive the AUTHREQ message from the AC 206 after a predetermined number of retries, the IWF 204 sends the RADIUS Access-Reject message containing the EAP-Failure to the WLAN 202. The inability to receive an AUTHREQ message may indicate network problems between the IWF 204 and AC 206.

If the IWF 204 is capable of verifying the challenge response from the MS 208, and such verification is successful, the IWF 204 generates the CMEA key. If the MS 208 is authenticated successfully, the IWF 204 sends a RADIUS Access-Accept message to the WLAN 202. Such message containing an EAP-Success message as well as the CMEA key. If the MS 208 fails the authentication, the IWF 204 sends a RADIUS Access-Reject message containing an EAP-Failure message to the WLAN 202.

Figure 4:
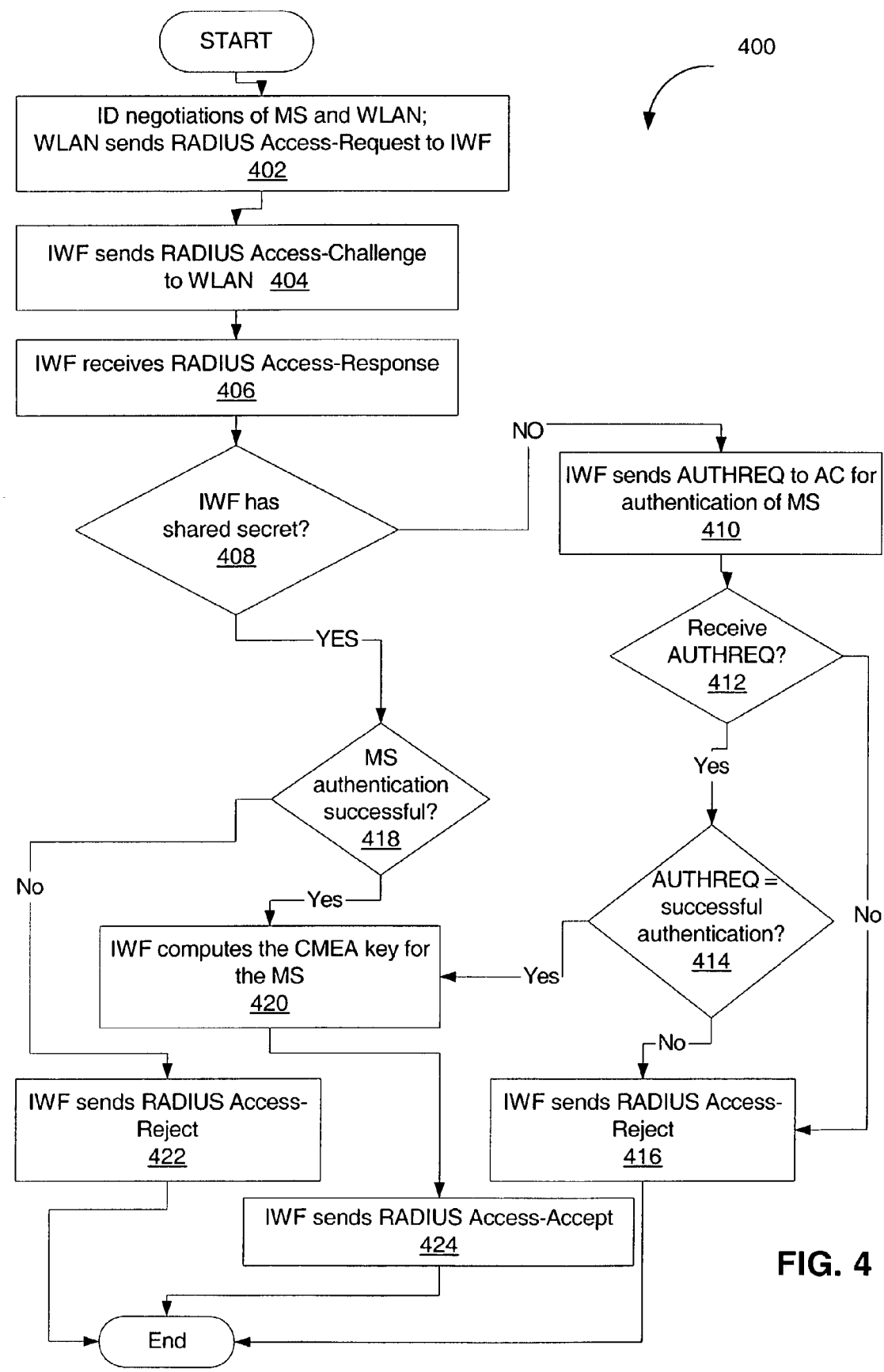
FIG. 4 is a flow diagram of an authentication process.

FIG. 4 illustrates an authentication process 400 according to one embodiment, wherein the MS 208 supports the CAVE protocol. The process starts when the MS 208 and the WLAN 202 begin identification negotiations at step 402. Also at this step, the WLAN 202 sends a RADIUS Access Request message containing the identity of the MS 208. As indicated hereinabove, the identity may be provided by way of the IMSI or other unique identifier for the MS 202. The process involves the MS 208 seeking access to the WLAN 202 and in response, the WLAN 202 requesting identification from the MS 208, step 402. At this point, the IWF 204 sends a RADIUS access challenge message to the WLAN 202, containing the CAVE challenge at step 404. In response to the challenge, the MS 208 computes a response and provides the response to the WLAN 208 (not shown). The response is then sent to the IWF 204 in a RADIUS access response message at step 406. If the IWF 204 does not have knowledge of the shared secret for the MS 208 at decision diamond 408, processing continues to step 410 wherein the IWF 204 sends an AUTHREQ message to AC 206. The AUTHREQ message requests authentication of the MS 208. If an AUTHREQ message is returned at decision diamond 412, processing continues to decision diamond 414 to determine if the AUTHREQ message indicates successful authentication, i.e., result of authentication is approval for access to the WLAN. If the AUTHREQ message is not received at decision diamond 412, processing continues to step 416, wherein the IWF sends a RADIUS access reject message.

Continuing from decision diamond 408, if the IWF 204 has knowledge of the MS 208 shared secret information, the IWF 204 is able to determine if authentication is successful at decision diamond 418. Successful authentication proceeds to step 420 to compute the CMEA key. A RADIUS access accept message is then sent at step 424. Note that successful authentication at step 414 (for authentication by the AC 206) also proceeds to step 420. From decision diamond 418, if the authentication is not successful, the IWF sends a RADIUS access reject message at step 422.

Figure 5:
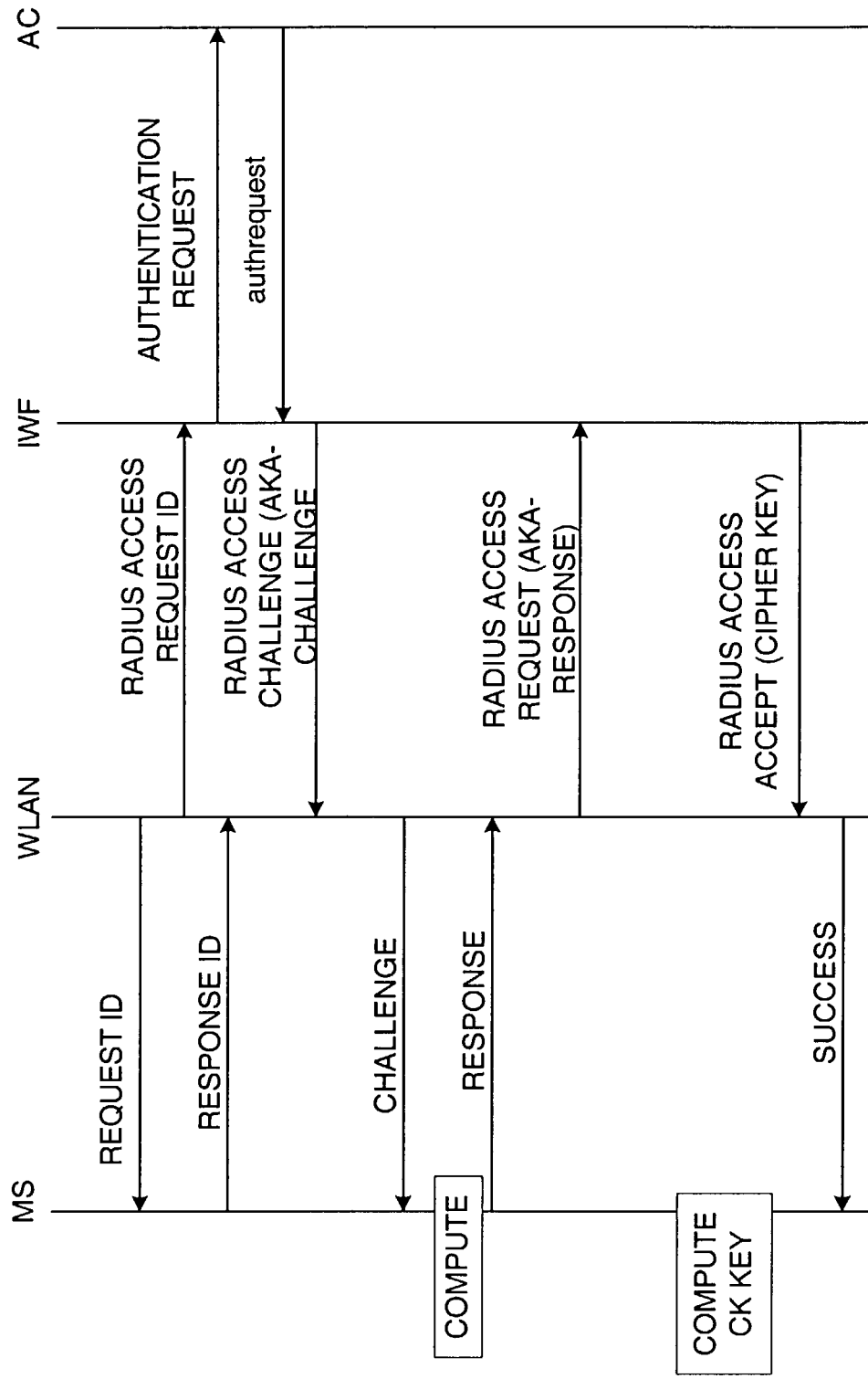
FIG. 5 is a timing diagram of an authentication process in a communication system.

In an alternate embodiment, the IWF 204 uses the AKA protocol for sending a challenge. As illustrated in FIG. 5, if the MS 208 supports AKA, the IWF 204 implements the AKA challenge, and the order of authentication processing is changed. In this scenario, the information sufficient to authenticate a user, such as MS 208, is provided in an Authentication Vector (AV). Note that the AC 206 may send the Shared Secret (SS) information in the AV to the IWF 204. According to the present embodiment, the AV includes the SS, the challenge and a Cipher Key (CK). The CK is used for encrypting MS traffic.

If the IWF 204 does not have the Authentication Vector (AV) to authenticate the MS 208, the IWF 204 sends an AUTHREQ message to request the AV from the AC 206. The AUTHREQ message contains the identify of the MS 208, such as the IMSI, and the request for the AV. The AC 206 replies with the AUTHREQ message that contains the AV. The AV consists of a random number (RAND), an expected response (XRES), a Cipher Key (CK), and an authentication token (AUTN). The AC may provide multiple AVs in the AUTHREQ message, so the IWF doesn't need to request from the AC 206 subsequent authentication.

If the IWF 204 is unable to receive the AUTHREQ message from the AC 206 (which may be after some predetermined number of retries), the IWF 204 sends a RADIUS Access Reject message containing an EAP-Failure message to the WLAN 202, such as when there are network problems between the IWF 204 and the AC 206.

If the received AUTHREQ does not contain the AV, the IWF 204 sends the RADIUS Access-Reject message containing the EAP-Failure message to the WLAN 202. For example, such a case may present when the MS 202 has an expired subscription.

If the IWF 204 has the AV, the IWF 204 sends a RADIUS Access-Challenge message containing an EAP-Request message having an AKA-Challenge to the WLAN 202. The AKA challenge contains the AUTN and the RAND. The AUTN conveys the AC 206 credentials and will be verified by the MS 208. The RAND is a challenge to the MS 208 that is used to compute an authentication response (RES). The MS 208 provides the RES to the WLAN 202.

The IWF 204 receives the RADIUS Access-Request message containing an EAP-Response including a CAVE-Challenge from the WLAN 202. The CAVE challenge contains the MS 208 authentication response (RES) received via the WLAN 202. The IWF 204 compares the RES with XRES. For a match, the MS 208 is authenticated successfully, and the IWF 204 sends a RADIUS Access-Accept message to the WLAN 202. Such message contains an EAP-Success message and a CK. The CK will be used for protecting the MS 208 traffic in WLAN 202. If the MS 208 fails the authentication, the IWF 204 sends a RADIUS Access-Reject message containing an EAP-Failure message to the WLAN 202.

Figure 6:
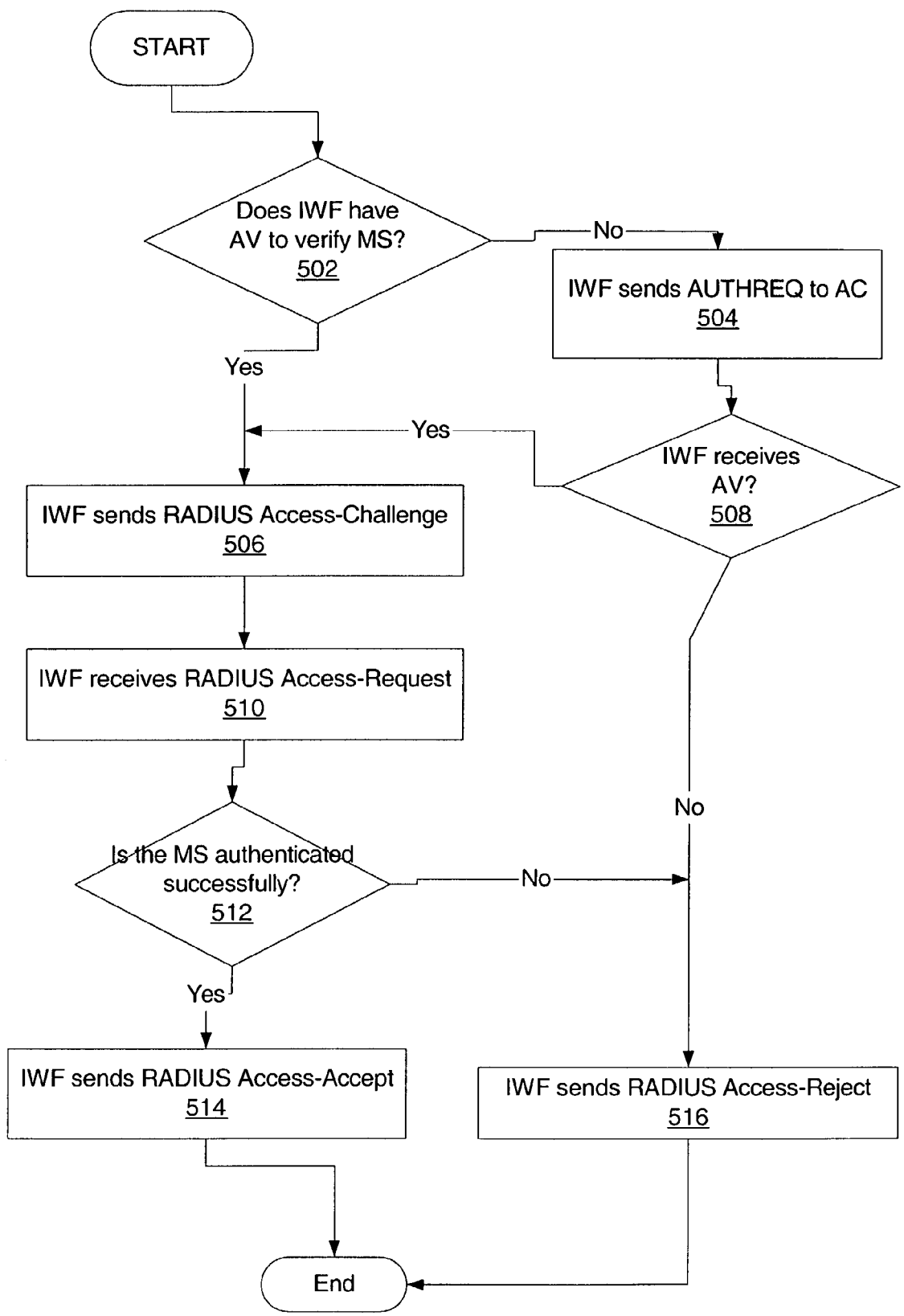
FIG. 6 is a flow diagram of an authentication process at an IWF in a communication system.

FIG. 6 illustrates an authentication procedure using the AV. If the IWF 204 has the AV to sufficient to verify MS 208 at decision diamond 502, the process continues to step 506, else processing continues to step 504. At step 506 the IWF 204 sends a RADIUS access challenge message to the WLAN 202 for MS 208. The challenge is then forwarded to the MS 208 for processing, and a response is provided back to the WLAN 202 (not shown). The IWF 204 receives the RADIUS access request message at step 510, and determines if the MS authentication is successful at decision diamond 512. On a successful authentication, the IWF 204 sends a Radius access accept message at step 514, else the IWF 204 sends a RADIUS access reject message at step 516.

Returning to decision diamond 502, if the IWF 204 does not have the AV, the IWF sends an AUTHREQU message to AC 206 at step 504. On receipt of the AV by the IWF at step 508, the IWF 204 continues processing to step 506, else processing continues to step 516.

Figure 7:
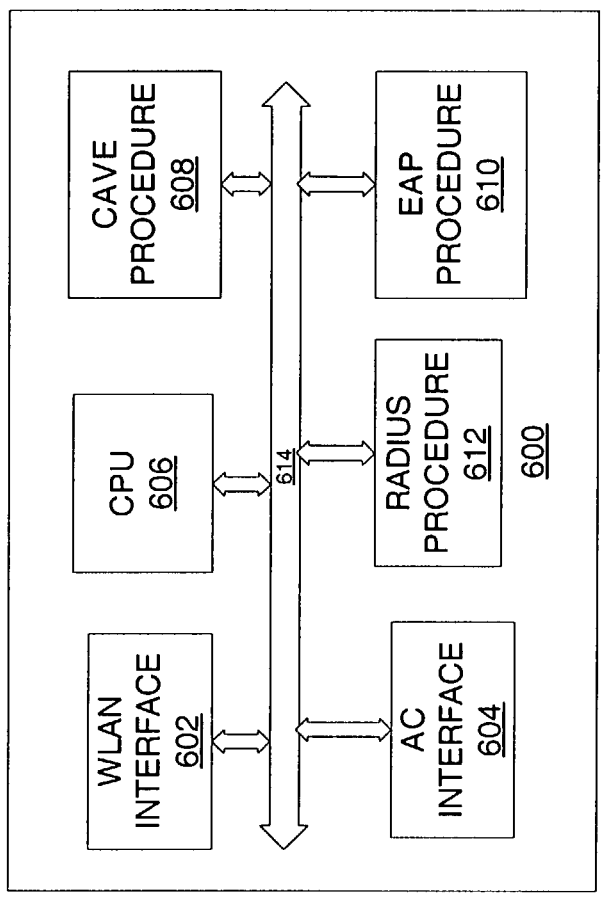
FIG. 7 is a flow diagram of authentication processing at a mobile station.

FIG. 7 illustrates an IWF 600 adapted to interface between a WLAN (not shown), and therefore capable of performing the procedures necessary for communication, authentication, key exchange, and other security communications therewith, and an AC (not shown), and therefore capable of performing the procedures necessary for communication, authentication, key exchange, and other security communications therewith. The IWF 600 includes a Central Processing Unit (CPU) 606, a WLAN interface unit 602, which prepares, transmits, receives and/or interprets communications with a WLAN. Similarly, IWF 600 includes an AC interface unit 604, which prepares, transmits, receives, and/or interprets communications with an AC. The IWF 600 further includes a CAVE procedure unit 608, an EAP procedure unit 610, and a RADIUS procedure unit 612. The IWF 600 may include any number of such procedure units (not shown) as required for inter-working function in a given system. The procedure units, such as CAVE procedure unit 608, EAP procedure 610 and RADIUS procedure 612, may be implemented in software, hardware, firmware, or a combination thereof. The various modules within IWF 600 communicate via communication bus 614.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for authenticating a wireless device by a cellular communication network for accessing a Wireless Local Area Network (WLAN), the method comprising:
generating an authentication access request by the wireless device based on a predetermined authentication key;
receiving the authentication access request from the wireless device via the WLAN in an Inter-working Function (IWF) apparatus in communication with the wireless device and the cellular communication network;
transmitting the received authentication access request to the cellular communication network by the IWF if the IWF does not possess information necessary to authenticate the wireless device for accessing the WLAN, wherein it is determined whether the IWF possesses the information necessary to authenticate the wireless device for accessing the WLAN, and wherein the authentication access request is not transmitted to the cellular communication network if it is determined that the IWF already possesses the information necessary to authenticate the wireless device for accessing the WLAN; and
if the IWF does not already possess information necessary to authenticate the wireless device for accessing the WLAN:
authenticating the authentication access request by the cellular communication network based on the predetermined authentication key; and
receiving an authentication access response generated by the cellular communication network based on the predetermined authentication key.

2. The method of claim 1, further comprising:
granting wireless device access by the WLAN to the WLAN if the authentication access request is authenticated the by the cellular communication network based on the predetermined authentication key.

3. The method of claim 1, the authentication access request is received in the IWF apparatus via a first transport protocol.

4. The method of claim 1, the authentication access request is transmitted to the cellular communication network via a second transport protocol.

5. An Inter-working Function (IWF) apparatus in communication with a Wireless Local Area Network (WLAN) and a cellular communication network communicating with a wireless device, the IWF apparatus comprising:
- means for generating an authentication access request by the wireless device based on a predetermined authentication key;
- means for receiving the authentication access request from the wireless device via the WLAN in an Inter-working Function (IWF) apparatus in communication with the wireless device and the cellular communication network;
- means for transmitting the received authentication access request to the cellular communication network by the IWF, wherein it is determined whether the IWF possesses information necessary to authenticate the wireless device for accessing the WLAN, wherein the authentication access request is transmitted to the cellular communication network if the IWF does not possess the information necessary to authenticate the wireless device for accessing the WLAN, and wherein the authentication access request is not transmitted to the cellular communication network if it is determined that the IWF already possesses the information necessary to authenticate the wireless device for accessing the WLAN;
- means for authenticating the authentication access request by the cellular communication network based on the predetermined authentication key; and
- means for receiving an authentication access response generated by the cellular communication network based on the predetermined authentication key.

6. A computer-program product for authenticating a wireless device by a cellular communication network for accessing a Wireless Local Area Network (WLAN), the computer-program product comprising a computer readable storage medium having instructions thereon, the instructions comprising:
- code for generating an authentication access request by the wireless device based on a predetermined authentication key;
- code for receiving the authentication access request from the wireless device via the WLAN in an Inter-working Function (IWF) apparatus in communication with the wireless device and the cellular communication network;
- code for transmitting the received authentication access request to the cellular communication network by the IWF, wherein it is determined whether the IWF possesses information necessary to authenticate the wireless device for accessing the WLAN, wherein the authentication access request is transmitted to the cellular communication network if the IWF does not possess the information necessary to authenticate the wireless device for accessing the WLAN, and wherein the authentication access request is not transmitted to the cellular communication network if it is determined that the IWF already possesses the information necessary to authenticate the wireless device for accessing the WLAN;
- code for authenticating the authentication access request by the cellular communication network based on the predetermined authentication key; and
- code for receiving an authentication access response generated by the cellular communication network based on the predetermined authentication key.

\* \* \* \* \*